(12) United States Patent
Madge et al.

(10) Patent No.: US 8,414,448 B2
(45) Date of Patent: Apr. 9, 2013

(54) GEAR SYSTEM FOR WIND TURBINE

(75) Inventors: James Henry Madge, Simpsonville, SC (US); Adam Daniel Minadeo, Greenville, SC (US); Priyangu Chunilal Patel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/222,178

(22) Filed: Aug. 31, 2011

(65) Prior Publication Data

US 2013/0052017 A1 Feb. 28, 2013

(51) Int. Cl.
*F16H 57/08* (2006.01)

(52) U.S. Cl.
USPC .......................................... 475/348; 475/331

(58) Field of Classification Search .................. 475/331, 475/346, 347, 348; 384/126–128, 535, 536, 384/581, 582
See application file for complete search history.

(56) References Cited

U.S. PATENT DOCUMENTS

| | | | | |
|---|---|---|---|---|
| 3,061,386 A * | 10/1962 | Willy et al. | | 384/535 |
| 3,642,331 A * | 2/1972 | Silver | | 384/102 |
| 3,890,854 A * | 6/1975 | Pitner | | 74/492 |
| 3,976,340 A * | 8/1976 | Pitner | | 384/581 |
| 4,394,091 A * | 7/1983 | Klomp | | 384/101 |
| 2004/0038771 A1* | 2/2004 | Fox | | 475/348 |
| 2009/0017954 A1* | 1/2009 | Nishida et al. | | 475/159 |
| 2010/0303626 A1* | 12/2010 | Mostafi | | 416/170 R |
| 2012/0108380 A1* | 5/2012 | Dinter et al. | | 475/159 |

FOREIGN PATENT DOCUMENTS

| | | |
|---|---|---|
| EP | 1544504 | 6/2005 |
| GB | 2473875 | 3/2011 |

OTHER PUBLICATIONS

Alexander Kari et al., Novel Attempts for Plain Bearing Solutions in Wind Turbine Drivetrains, 14 pages, Mar. 16, EWEA Conference Brussels 2011.

* cited by examiner

*Primary Examiner* — Justin Holmes
(74) *Attorney, Agent, or Firm* — Dority & Manning, P.A.

(57) ABSTRACT

A gear system, such as for use in a wind turbine, is disclosed. The gear system includes a carrier, a gear defining a central axis, and a pin extending along the central axis and coupling the gear to the carrier. The gear system further includes a roller bearing surrounding the pin, the roller bearing comprising a plurality of roller elements, and a journal bearing surrounding the pin.

20 Claims, 4 Drawing Sheets

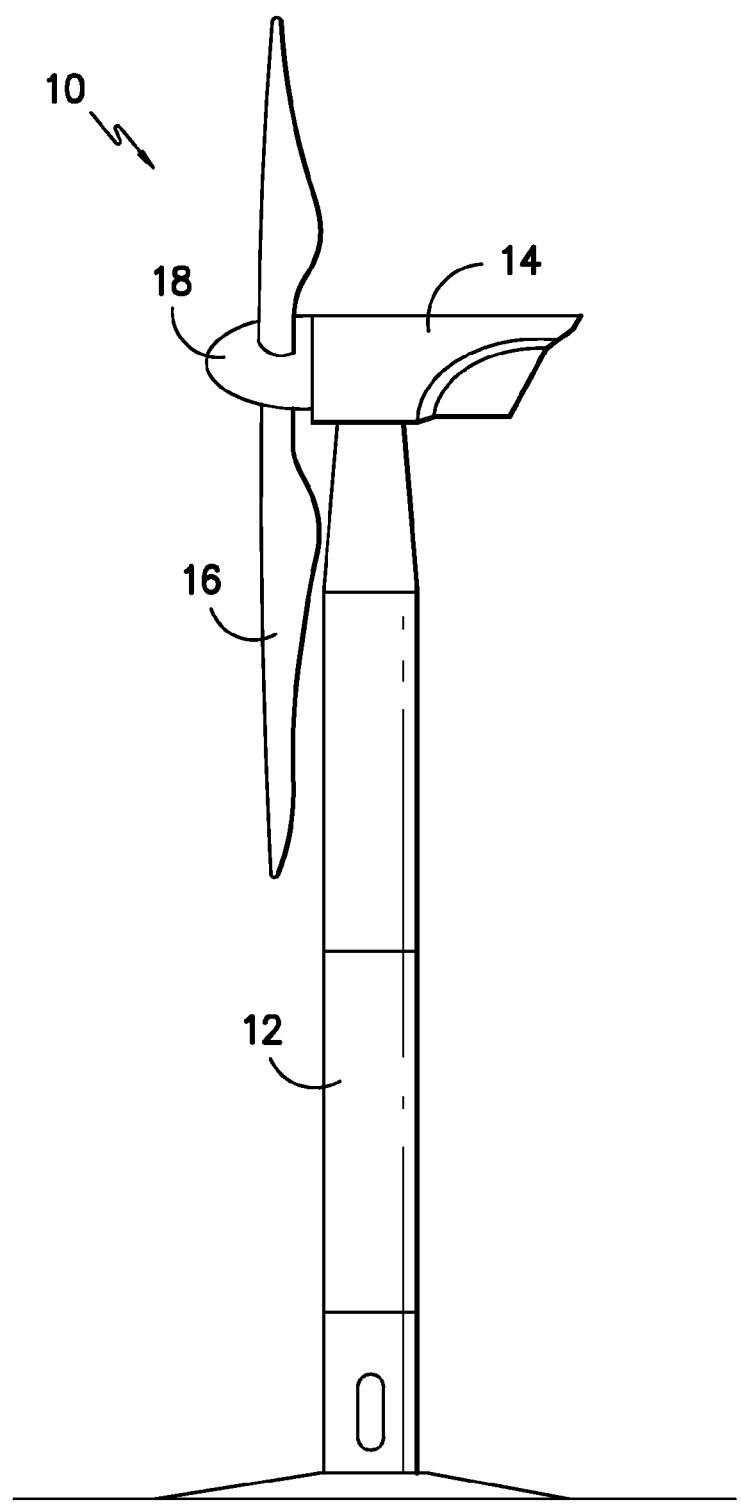
FIG. -1-
PRIOR ART

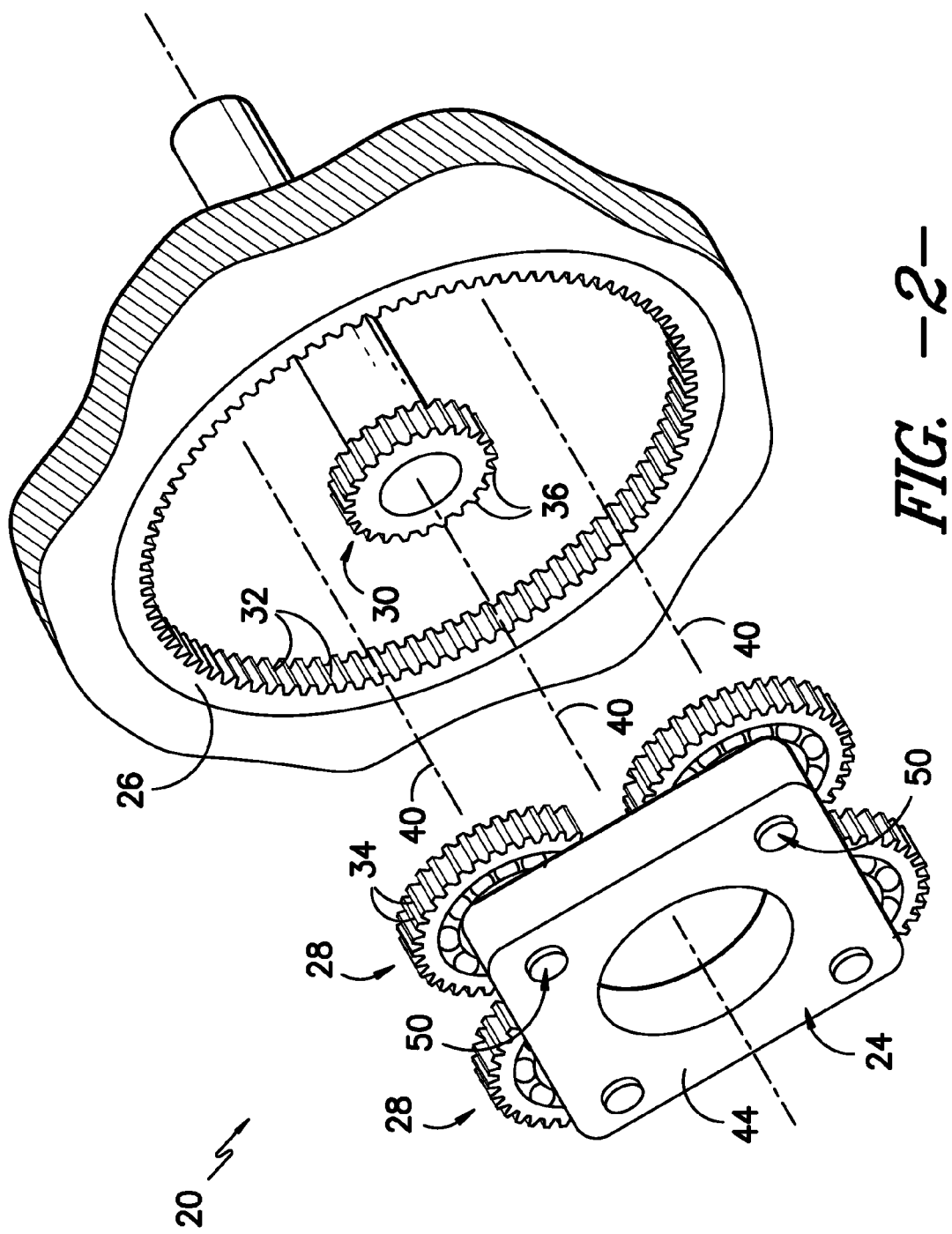
FIG. -2-

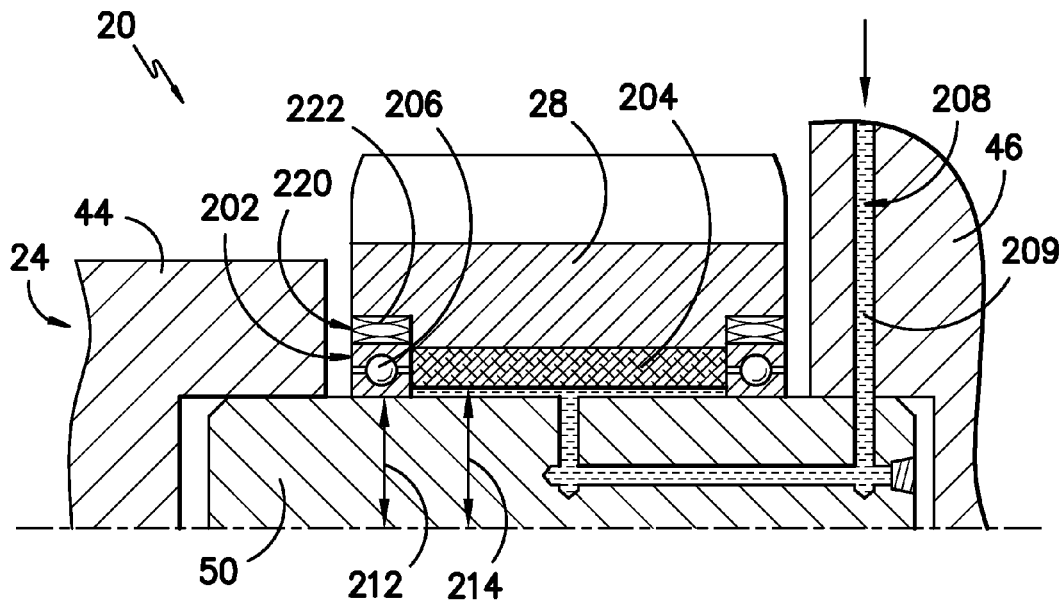
FIG. -3-
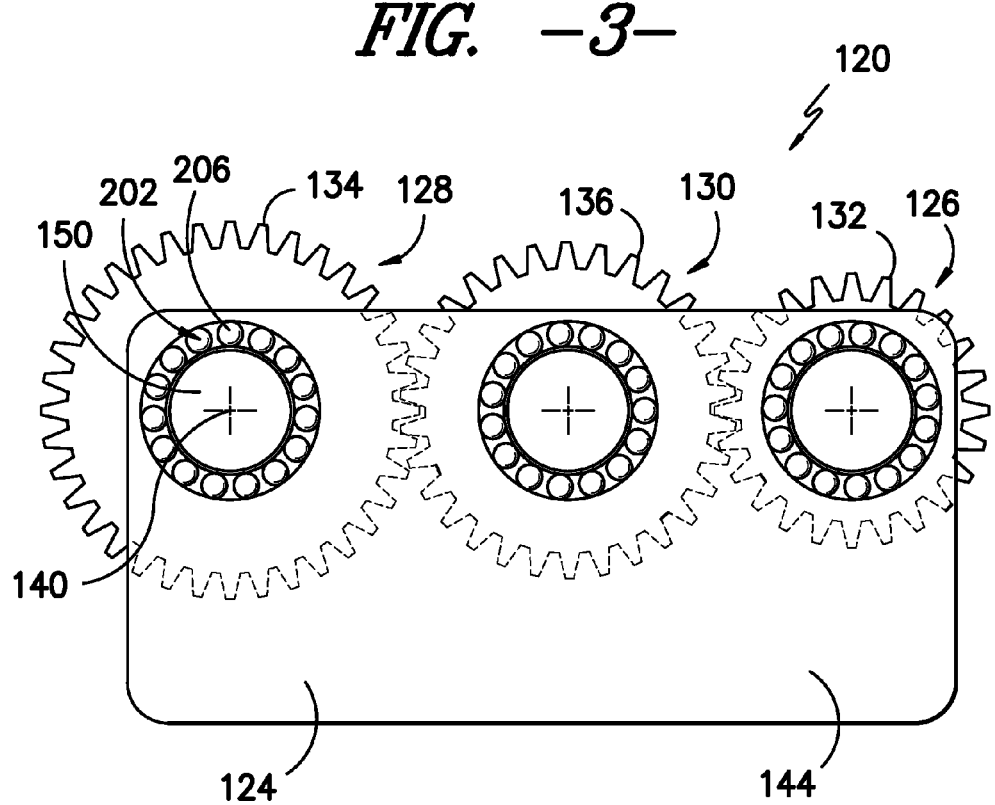
FIG. -4-

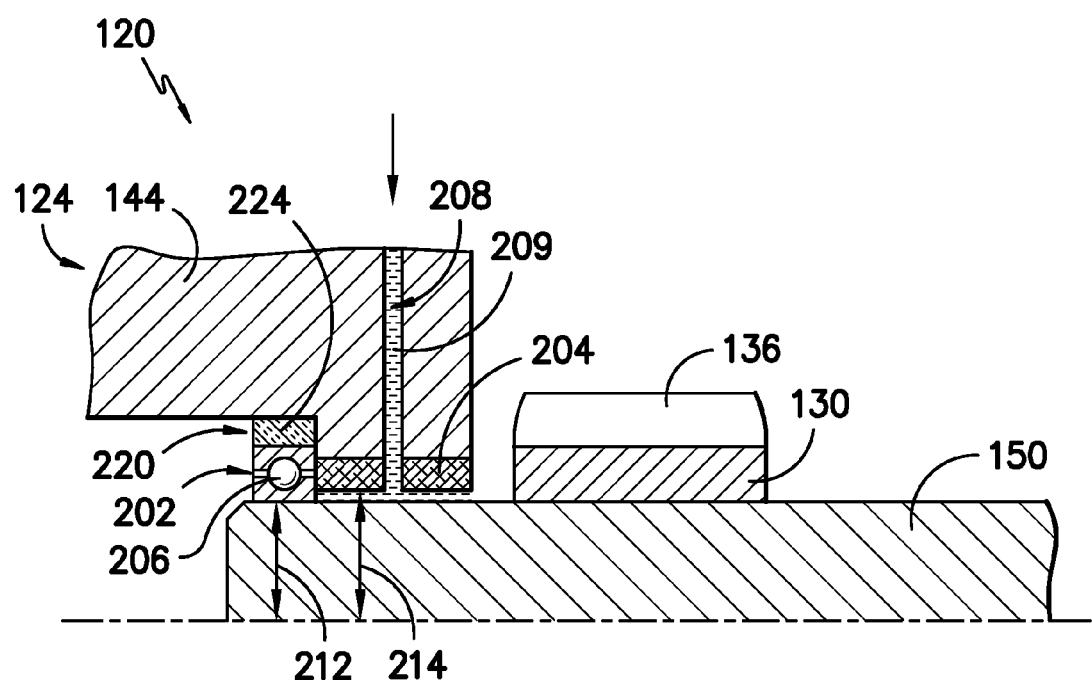
FIG. —5—

GEAR SYSTEM FOR WIND TURBINE

FIELD OF THE INVENTION

The present disclosure relates in general to gear systems, and more particularly to improved loading features in gear systems, such as in gear systems for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gear system, or if a gear system is not used, directly to the generator. The generator then converts the mechanical energy to electrical energy that may be deployed to a utility grid.

Typically, planetary gear systems are utilized in wind turbines, although parallel shaft gear systems and other suitable gear systems have also been utilized. Further, appropriate bearings must be selected and utilized for such gear systems due to the significant loading that the gear system experiences during operation of the wind turbine.

One example of a bearing that would be useful for reacting such relatively high loads is a journal bearing. However, during periods of low loading, or during start and stop cycles for the wind turbine, the journal bearings are generally exposed to high wear conditions, which can damage or destroy the journal bearings. Because such periods and cycles are frequent during the operation of a wind turbine, journal bearings are thus typically not utilized despite their high load reacting capabilities.

Thus, typical gear systems for wind turbines currently utilize roller bearings. However, roller bearings are relatively expensive components, and significantly increase the overall costs of the gear system.

Accordingly, an improved gear system is desired in the art. For example, a gear system that can react high loads and that is relatively inexpensive would be advantageous.

BRIEF DESCRIPTION OF THE INVENTION

Aspects and advantages of the invention will be set forth in part in the following description, or may be obvious from the description, or may be learned through practice of the invention.

In one embodiment, a gear system is disclosed. The gear system includes a carrier, a gear defining a central axis, and a pin extending along the central axis and coupling the gear to the carrier. The gear system further includes a roller bearing surrounding the pin, the roller bearing comprising a plurality of roller elements, and a journal bearing surrounding the pin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is an exploded perspective view of a planetary gear system according to one embodiment of the present disclosure;

FIG. 3 is a partial cross-sectional view of portions of a planetary gear system according to one embodiment of the present disclosure;

FIG. 4 is a front view of a parallel shaft gear system according to one embodiment of the present disclosure; and, FIG. 5 is a partial cross-sectional view of portions of a parallel shaft gear system according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

The present disclosure is further directed to a gear system. The gear system may be utilized in a wind turbine 10. However, it should be understood that the present disclosure is not limited the use of such gear systems in wind turbines, and rather that any suitable gear systems applications are within the scope and spirit of the present disclosure. Further, as discussed below, a gear system according to the present disclosure may be a planetary gear system, a parallel shaft gear system, or any other suitable gear system.

When utilized in a wind turbine 10, a gear system may, for example, be housed in the nacelle 14. An input shaft (not shown) may provide an input load to the system. The system may further provide an output load to a generator (not shown), as is generally known in the art. Thus, during operation, input load at an input rotational speed is transmitted through the gear system and provided as output load at output rotational speed to, for example, the generator.

FIGS. 2 and 3 illustrate embodiments of a planetary gear system 20 according to the present disclosure. The planetary gear system 20 may be a single stage planetary gear system 20. Thus, the input rotational speed may be converted to the output rotational speed through a single stage of various mating gears, as discussed below. Alternatively, however, the planetary gear system 20 may be a multiple stage planetary gear system 20, and the input rotational speed may be converted to the output rotational speed through multiple stages of various mating gears.

The planetary gear system 20 includes a carrier 24 and a plurality of gears. For example, the planetary gear system 20 in exemplary embodiments as shown includes a ring gear 26, one or more planet gears 28, and a sun gear 30. The system 20 may include one, two, three, four, five, six, seven, eight, or more planet gears 28. Each of the gears 26, 28, 30 includes a plurality of teeth. For example, the ring gear 26 includes teeth 32, each planet gear 28 includes teeth 34, and each sun gear 30 includes teeth 36. The teeth 32, 34, and 36 are sized and shaped to mesh together such that the various gears 26, 28, 30 engage each other. For example, the ring gear 26 and the sun gear 30 may each engage the planet gears 28.

In some embodiments, the carrier 24 may be stationary. In these embodiments, the input shaft may be coupled to the ring gear 26, and input loads on the input shaft may be transmitted through the ring gear 26 to the planet gears 28. Thus, the ring gear 26 may drive the system 20. In other embodiments, the ring gear 26 may be stationary. In these embodiments, the input shaft may be coupled to the carrier 24, and input loads on the input shaft may be transmitted through the carrier 24 to the planet gears 28. Thus, the carrier 24 may drive the system 20. In still further embodiments, any other suitable component, such as a planet gear 28 or sun gear 30, may drive the system 20.

The sun gear 30 in exemplary embodiments defines a central axis 40, and thus rotates about this central axis 40. The ring gear 26 may at least partially surround the sun gear 30, and be positioned along the central axis 40. For example, the ring gear 26 may be aligned with the sun gear 30 along the central axis 40, or may be offset from the sun gear 30 along the axis 40. The ring gear 26 may (if rotatable) thus rotate about the central axis 40.

Each of the planet gears 28 may be disposed between the sun gear 30 and the ring gear 26, and may engage both the sun gear 30 and the ring gear 26. For example, the teeth 32, 34, and 36 may mesh together, as discussed above. Further, each of the planet gears 28 may define a central axis 40, as shown. Thus, each planet gear 28 may rotate about its central axis 40. Additionally, the planet gears 28 and central axes 40 thereof may rotate about the central axis 40 of the sun gear 30.

The carrier 24 may be disposed adjacent the planet gears 28, and may further be positioned along the central axis 40. The carrier 24 may include a first carrier plate 44 and, in some embodiments, a second carrier plate (not shown). In embodiments wherein the carrier 24 includes both a first carrier plate 44 and a second carrier plate, the planet gears 28 may be disposed therebetween.

Each planet gear 28 according to the present disclosure may be coupled to the carrier 24. For example, a pin 50 may extend through at least a portion of the carrier 24 and planet gear 28 to couple the planet gear 28 and carrier 24 together. The pin 50 may extend and be positioned along the central axis 40, such that the planet gear 28 may rotate about the pin 50.

In exemplary embodiments, a pin 50 according to the present disclosure may be fixidly mounted to the carrier 24. For example, the pin 50 may be press-fit into the carrier 24, or may be secured with an adhesive or mechanical fastener, or may be otherwise fixidly mounted thereto. Alternatively, however, a pin 50 may be movably mounted to the carrier 24, such that the pin 50 is rotatable with respect to the carrier 24.

In some embodiments, only one end of the pin 50 is supported. For example, one end of the pin 50 may extend through and thus be supported by the first carrier plate 44, while the other end does not extend through and is not supported by the second carrier plate, or vice versa. In alternative embodiments, however, both the ends may be supported, such as by first carrier plate 44 and second carrier plate.

FIGS. 4 and 5 illustrate embodiments of a parallel shaft gear system 120 according to the present disclosure. The parallel shaft gear system 120 may be a single stage parallel shaft gear system 20. Thus, the input rotational speed may be converted to the output rotational speed through a single stage of mating gears, as discussed below. Alternatively, however, the parallel shaft gear system 120 may be a multiple stage parallel shaft gear system 120, and the input rotational speed may be converted to the output rotational speed through multiple stages of various mating gears.

The parallel shaft gear system 120 includes a carrier 124 and a plurality of gears. For example, the parallel shaft gear system 120 in exemplary embodiments as shown includes an input gear 126 and an output gear 128, and may further include various intermediate gears 130. Each of the gears 126, 128, 130 includes a plurality of teeth. For example, the input gear 126 includes teeth 132, the output gear 128 includes teeth 134, and each intermediate gear 130 includes teeth 136. The teeth 132, 134, and 36 are sized and shaped to mesh together such that the various gears 126, 128, 130 engage each other. For example, the input gear 126 may engage an intermediate gear 130, and an intermediate gear 130 may engage another intermediate gear 130 or an output gear 128.

The input shaft may be coupled to the input gear 126, and input loads on the input shaft may be transmitted through the input gear 126 to the intermediate gears 130 and output gear 128. Thus, the input gear 126 may drive the system 120.

Each gear 126, 128, 130 in exemplary embodiments defines a central axis 40, and thus rotates about this central axis 40.

The carrier 124 may be disposed adjacent the planet gears 128. The carrier 124 may include a first carrier plate 144 and, in some embodiments, a second carrier plate (not shown). In embodiments wherein the carrier 124 includes both a first carrier plate 144 and a second carrier plate, various of the gears 126, 128, 130 may be disposed therebetween.

Each gear 126, 128, 130 according to the present disclosure may be coupled to the carrier 124. For example, a pin 150 may extend through at least a portion of the carrier 24 and a gear 126, 128, 130 to couple the gear 126, 128, 130 and carrier 124 together. The pin 150 may extend and be positioned along the central axis 140.

In exemplary embodiments, a pin 150 according to the present disclosure may be movably mounted to the carrier 124, such that the pin 150 is rotatable with respect to the carrier 124. Alternatively, however, a pin 150 may be fixidly mounted to the carrier 124. For example, the pin 150 may be press-fit into the carrier 124, or may be secured with an adhesive or mechanical fastener, or may be otherwise fixidly mounted thereto.

In some embodiments, only one end of the pin 150 is supported. For example, one end of the pin 150 may extend through and thus be supported by the first carrier plate 144, while the other end does not extend through and is not supported by the second carrier plate, or vice versa. In alternative embodiments, however, both the ends may be supported, such as by first carrier plate 144 and second carrier plate.

As shown in FIGS. 2 through 5, a gear system according to the present disclosure may further include one or more roller bearings 202 and one or more journal bearings 204 surrounding each pin 50, 150 of the gear system. For example, a roller bearing 202 may surround a pin 50, 150. The roller bearing 202 may include a plurality of roller elements 206, which may be arranged in one or more annular arrays about the pin 50, 150. A journal bearing 204 may additionally surround a pin 50, 150. The journal bearing 204 may be adjacent to or spaced apart from the roller bearing 202. Further, a journal passage 208 may be defined through various components of the gear system, such as through the journal bearing 204, carrier 24, 124, and/or pin 50, 150. The journal passage 208 may thus be in fluid communication with the journal bearing 204 for flowing a journal fluid 209 therethrough. The journal fluid 209 may in exemplary embodiments be oil or any other suitable liquid for creating a hydrodynamic layer between the journal bearing 204 and another component of the gear system, such as the pin 50, 150, during operation of the gear system.

In some embodiments, such as when the gear system is a planetary gear system 20 as shown in FIG. 3, the roller bearing 202 and journal bearing 204 may be disposed between the pin 50, 150 and a gear, such as planet gear 28 or any other suitable gear, surrounding the pin 50, 150. In these embodiments, the gear may be movable with respect to the pin 50, 150. In other embodiments, such as when the gear system is a parallel shaft gear system 120 as shown in FIG. 5, the roller bearing 202 and journal bearing 204 may be disposed between the pin 50, 150 and the carrier 24, 124. In these embodiments, the pin 50, 150 may be movable with respect to the carrier 24, 124.

In general, the roller bearings 202 and journal bearings 204 of the present disclosure may be designed to operate at different times during operation of the gear system. For example, the journal bearings 204 may be designed to operate during normal operation of the gear system, when the gear system is experiencing operational loads. The journal bearing 204 may desirably react these relatively high loads during such normal operation. Normal operational loads for a gear system in a wind turbine may vary depending on the size of the wind turbine as well as other factors. For example, in one embodiment, a 2.75 MW wind turbine which has a rated torque of approximately 2,250 kNm may, at this rated torque, subject a first stage planet gear to a load of approximately 1,150 kN. In other words, this load may act on the bearings surrounding and supporting the planet gear. Thus, a normal operational load for a gear system in a wind turbine may be in the range between approximately 35% and approximately 65%, approximately 40% and approximately 60%, or approximately 45% and approximately 55% of the rated torque for the wind turbine. However, it should be understood that the normal operational loads of a gear system according to the present disclosure are not limited to the above disclosed ranges, and rather that any suitable loads are within the scope and spirit of the present disclosure.

As mentioned, during normal operation of the gear system, a hydrodynamic layer may be created by the journal fluid 209, as is generally known in the journal bearing art. Thus, all or substantially all load reaction during normal operation of the gear system is performed by the journal bearing 204. The roller bearings 202 may contact the pin 50, 150, but perform minimal or no load reaction due to the hydrodynamic layer and an optional compliant layer, as discussed below.

The roller bearings 202 may be designed to operate during non-normal operation of the gear system, when the gear system is experiencing non-operational loads, which are typically lower than operational loads. For example, non-normal operation may include start-up operation, shut-down operation, and/or periods of relatively low loading. Low loading may be experienced during, for example, between approximately 10% and approximately 25% of the lifetime of a wind turbine. During such non-normal operation, the hydrodynamic layer created between the journal bearing 204 and pin 50, 150 may be reduced or eliminated. However, the roller bearing 202 may contact the pin 50, 150, thus reacting the loads experienced during non-normal operation and preventing the pin 50, 150 from contacting and damaging or destroying the journal bearing 204. In some embodiments, an inner radius 212 of the roller bearing 202 may be less than an inner radius 214 of the journal bearing 204. This may allow the roller bearing 202 to contact the pin 50, 150 and prevent contact with the journal bearing. The sizing of the roller bearing 202 and journal bearing 204 may, in exemplary embodiments, thus be such that the pin 50, 150 does not contact the journal bearing 204.

A roller bearing 202 according to the present disclosure may in exemplary embodiments be a relatively low load roller bearing 202. Such roller bearings 202, while not able to withstand and react relatively higher loads such as loads during normal operation, can handle lower non-normal operational loads and are further relatively inexpensive. It should be understood, however, that the present disclosure is not limited to low load roller bearings 202, and rather that any suitable roller bearings 202 are within the scope and spirit of the present disclosure.

In some embodiments, as shown in FIGS. 3 and 5, a compliant assembly 220 may surround a roller bearing 202. Thus the compliant assembly 220 may be disposed between the roller bearing 202 and, for example, a carrier as shown in FIG. 5 or a gear as shown in FIG. 3. The compliant assembly 220 may react a portion of the loads to which the roller bearing 202 is subjected, thus limiting the loads experienced by the roller bearing 202. The compliant assembly 220 may generally have a stiffness or modulus of elasticity that is high enough to support the pin 50, 150 during periods of non-normal operation, but low enough such that the loads experienced by the roller bearing are limited. Further, during normal operation, the compliant assembly 220 may deflect due to higher loading, thus preventing the roller bearing 202 from experiencing and reacting such high loads or reducing the amount of the loading that the roller bearing 202 experiences and reacts.

In some embodiments, as shown in FIG. 3, the compliant assembly 220 may include one or more spring members 222. In other embodiments, as shown in FIG. 5, the compliant assembly 220 may include a layer 224 formed at least in part from a suitable material, such as a rubber, with suitable stiffness or modulus of elasticity.

The use of journal bearings 204 and roller bearings 202 in gear systems as disclosed herein advantageously allows for relatively high loads experienced during normal operation to be adequately reacted. Additionally, such gear systems prevent the damage or destruction of the various components of the gear system during periods of non-normal operation. Further, the various components of such gear systems are relatively inexpensive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A planetary gear system, comprising:
   a carrier;
   a gear defining a central axis;
   a pin extending along the central axis and coupling the gear to the carrier;
   a roller bearing disposed between the pin and the gear, the roller bearing comprising a plurality of roller elements;
   a journal bearing disposed between the pin and the gear; and
   a journal fluid disposed between the journal bearing and the pin, wherein the journal fluid is a liquid.

2. The planetary gear system of claim 1, further comprising a compliant assembly surrounding the roller bearing.

3. The planetary gear system of claim 2, wherein the compliant assembly comprises a plurality of spring members.

4. The planetary gear system of claim 2, wherein the compliant assembly comprises a rubber layer.

5. The planetary gear system of claim 1, wherein an inner radius of the roller bearing is less than an inner radius of the journal bearing.

6. The planetary gear system of claim 1, wherein the roller bearing and journal bearing are sized such that the pin does not contact the journal bearing.

7. The planetary gear system of claim 1, further comprising a journal passage defined in the carrier and in fluid communication with the journal bearing.

8. A wind turbine, comprising:
   a tower;
   a nacelle mounted to the tower; and,
   a gear system housed in the nacelle, the gear system comprising:
      a carrier;
      a gear defining a central axis;
      a pin extending along the central axis and coupling the gear to the carrier;
      a roller bearing surrounding the pin, the roller bearing comprising a plurality of roller elements;
      a journal bearing surrounding the pin; and
      a journal fluid disposed between the journal bearing and the pin, wherein the journal fluid is a liquid.

9. The wind turbine of claim 8, further comprising a compliant assembly surrounding the roller bearing.

10. The wind turbine of claim 8, wherein an inner radius of the roller bearing is less than an inner radius of the journal bearing.

11. The wind turbine of claim 8, wherein the roller bearing and journal bearing are sized such that the pin does not contact the journal bearing.

12. A gear system, comprising:
    a carrier;
    a gear defining a central axis;
    a pin extending along the central axis and coupling the gear to the carrier;
    a roller bearing surrounding the pin, the roller bearing comprising a plurality of roller elements;
    a journal bearing surrounding the pin; and
    a journal fluid disposed between the journal bearing and the in wherein the journal fluid is a liquid.

13. The gear system of claim 12, further comprising a compliant assembly surrounding the roller bearing.

14. The gear system of claim 13, wherein the compliant assembly comprises a plurality of spring members.

15. The gear system of claim 13, wherein the compliant assembly comprises a rubber layer.

16. The gear system of claim 12, wherein an inner radius of the roller bearing is less than an inner radius of the journal bearing.

17. The gear system of claim 12, wherein the roller bearing and journal bearing are sized such that the pin does not contact the journal bearing.

18. The gear system of claim 12, further comprising a journal passage defined in the carrier and in fluid communication with the journal bearing.

19. The gear system of claim 12, wherein the roller bearing and the journal bearing are disposed between the pin and the gear.

20. The gear system of claim 12, wherein the roller bearing and the journal bearing are disposed between the pin and the carrier.

* * * * *

UNITED STATES PATENT AND TRADEMARK OFFICE
CERTIFICATE OF CORRECTION

PATENT NO. : 8,414,448 B2
APPLICATION NO. : 13/222178
DATED : April 9, 2013
INVENTOR(S) : James Henry Madge, Adam Daniel Minadeo and Priyangu Chunilal It is certified that error appears in the above-identified patent and that said Letters Patent is hereby corrected as shown below:

In the Claims:

Column 8, line 18 "the in wherein" should read --the pin, wherein--.

Signed and Sealed this
Twenty-fourth Day of September, 2013

Teresa Stanek Rea
*Deputy Director of the United States Patent and Trademark Office*